US012641187B2

(12) United States Patent
Yamada et al.

(10) Patent No.: US 12,641,187 B2
(45) Date of Patent: May 26, 2026

(54) IMAGE PROCESSING APPARATUS, IMAGE PROCESSING METHOD, AND NON-TRANSITORY COMPUTER READABLE MEDIUM COMPRISING EXTRACTING FIRST TARGET IMAGE AND SECOND TARGET IMAGE FROM A READING TARGET AND FORMING A COMPOSITE IMAGE COMPRISED OF A NON-GLOSSY REGION AND A GLOSSY REGION AFTER PERFORMING AN ALIGNMENT OF TARGET IMAGES

(71) Applicant: FUJIFILM Business Innovation Corp., Tokyo (JP)

(72) Inventors: Kenji Yamada, Kanagawa (JP); Takaharu Sato, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/177,878

(22) Filed: Mar. 3, 2023

(65) Prior Publication Data

US 2024/0080403 A1 Mar. 7, 2024

(30) Foreign Application Priority Data

Sep. 2, 2022 (JP) ................................. 2022-140316

(51) Int. Cl.
*H04N 1/387* (2006.01)
*H04N 1/00* (2006.01)
(52) U.S. Cl.
CPC ....... *H04N 1/3876* (2013.01); *H04N 1/00809* (2013.01); *H04N 1/00816* (2013.01); *H04N 1/00824* (2013.01); *H04N 1/3877* (2013.01)

(58) Field of Classification Search
CPC ........... H04N 1/00809; H04N 1/00816; H04N 1/00824; H04N 1/387; H04N 1/3871; H04N 1/3876; H04N 1/3877; H04N 1/6097

(Continued)

(56) References Cited

U.S. PATENT DOCUMENTS

| 2021/0092252 A1* | 3/2021 | Horikawa ............ H04N 1/0305 |
| 2022/0150380 A1* | 5/2022 | Machii ................. G06N 3/0475 |
| 2023/0290016 A1* | 9/2023 | Yamada ................. G06T 11/10 |

FOREIGN PATENT DOCUMENTS

| JP | 4024737 B2 | 12/2007 |
| JP | 2007325050 A * | 12/2007 |

OTHER PUBLICATIONS

Kimura (Year: 2007).*

* cited by examiner

*Primary Examiner* — Chad Dickerson
(74) *Attorney, Agent, or Firm* — Oliff PLC

(57) ABSTRACT

An image processing apparatus includes a processor configured to: extract a first target image corresponding to a reading target having a glossy portion and a non-glossy portion from a first read image acquired by optically reading the reading target in a first reading environment, and extract a second target image corresponding to the reading target from a second read image acquired by optically reading the reading target in a second reading environment in which specular light acquired from the reading target by an image sensor is of higher intensity compared to the first reading environment; execute an alignment of the first target image and the second target image if positions of the first and second target images do not coincide with each other and if the first and second target images are alignable by translating or rotating at least one of the first target image or the second (Continued)

C1, C2  TI1

14

TI2

AUTOMATIC CORRECTION AVAILABLE.

COMPOSITE IMAGE
AFTER ALIGNMENT

COMPOSITE IMAGE
WITHOUT ALIGNMENT

NCI

CI

IS THIS CORRECT?

Yes   No (RESCAN)

target image; and form a composite image by executing a composition process that composites a non-glossy region corresponding to the non-glossy portion extracted from the first target image with a glossy region corresponding to the glossy portion extracted from the second target image.

11 Claims, 16 Drawing Sheets

(58) Field of Classification Search
 USPC ........................................................ 358/450
 See application file for complete search history.

SI2

TI2

IMAGE PROCESSING APPARATUS, IMAGE PROCESSING METHOD, AND NON-TRANSITORY COMPUTER READABLE MEDIUM COMPRISING EXTRACTING FIRST TARGET IMAGE AND SECOND TARGET IMAGE FROM A READING TARGET AND FORMING A COMPOSITE IMAGE COMPRISED OF A NON-GLOSSY REGION AND A GLOSSY REGION AFTER PERFORMING AN ALIGNMENT OF TARGET IMAGES

CROSS-REFERENCE TO RELATED APPLICATIONS

This application is based on and claims priority under 35 USC 119 from Japanese Patent Application No. 2022-140316 filed Sep. 2, 2022.

BACKGROUND

(i) Technical Field

The present disclosure relates to an image processing apparatus, an image processing method, and a non-transitory computer readable medium.

(ii) Related Art

In the related art, there is an image reading apparatus (scanner) that irradiates a reading target with light from a light source, receives reflected light from the reading target with an image sensor, and forms a read image expressing the reading target.

In the case of irradiating the reading target with light, the luminous flux of specular light may vary depending on the surface characteristics (such as the presence or absence of gloss, for example) of the reading target. Here, specular light refers to reflected light in which the angle of reflection is the same as the angle of incidence of the incident light on the reading target. Also, luminous flux refers to the light intensity per unit time. That is, the light intensity is the time integral of the luminous flux. Note that the light intensity may also be referred to as the energy of the light. Consequently, if the image sensor is disposed to receive specular light, a problem may occur in which the image quality (such as the brightness, for example) of the read image varies depending on the surface characteristics of the reading target. On the other hand, the luminous flux of diffuse light, that is, the reflected light (reflected at various angles of reflection) other than specular light, varies little depending on the surface characteristics of the reading target.

Accordingly, in the image reading apparatus of the related art, as illustrated in FIG. 19, it is typical to dispose an image sensor S to receive reflected light that is reflected in the perpendicular direction relative to an incident position P of a reading target T that is placed on a platen PL, after which a light source L is disposed so that the incident light I on the reading target T (specifically, the incident position P) has an angle of incidence of approximately 45°. With this arrangement, the image sensor S mostly receives the diffuse light D indicated by the dashed lines while receiving little or no specular light R, and therefore variations in the image quality of the read image due to differences in the surface characteristics of the reading target T are suppressed.

Incidentally, in some cases, the reading target may include a glossy portion with strong glossiness. A glossy portion may be defined to be a portion where the specular reflectance is equal to or greater than a prescribed reflectance. Specular reflectance refers to the ratio of the luminous flux of the light (namely, specular light) that is reflected from the surface of the reading target at an angle of reflection that is the same as a given angle of incidence, with respect to the luminous flux of the light that is incident at the given angle of incidence. Note that specular reflectance may also be referred to as mirror reflectance in some cases.

In other words, reflected light from the glossy portion may be thought of as having a high luminous flux of specular light and a low luminous flux of diffuse light. Consequently, in a typical image reading apparatus of the related art that forms a read image mostly on the basis of diffuse light, diffuse light of sufficient intensity may not be obtained from the glossy portion. Thus, a problem occurs in that, in the read image, a glossy region corresponding to the glossy portion of the reading target is darkened, and a glossy appearance (a texture corresponding to the texture that a human being perceives when looking at the glossy portion of the reading target) like that of the reading target may not be reproduced in the read image. Note that in this specification, as described above, the portion (group of pixels) in the read image that corresponds to the "glossy portion" of the reading target is designated the "glossy region". Also, the portion other than the glossy portion of the reading target is designated the "non-glossy portion", and the portion (group of pixels) in the read image that corresponds to the "non-glossy portion" of the reading target is designated the "non-glossy region".

To address the above problem, a technology of the related art has been proposed to reproduce, in a read image obtained by reading a reading target having a glossy portion, the glossy appearance of a glossy region corresponding to the glossy portion.

For example, Japanese Patent No. 4024737 discloses an image reading apparatus that obtains a first read image by normal scanning and obtains a second read image (one in which the glossy appearance of the glossy region is reproduced) by performing scanning with a reflected light control member that scatters light being disposed between the light source and the reading target. In the image reading apparatus of the related art, after the glossy portion is detected from the reading target on the basis of the first read image and the second read image, a composition process is performed to composite the first read image and the second image in such a manner that the second read image is selected for pixels inside the glossy region of the read images, and the first read image is selected for pixels inside the non-glossy region of the read image. With this configuration, a read image that reproduces the glossy appearance of the glossy region is formed.

SUMMARY

Incidentally, consider the following method of optically reading a reading target having a glossy portion and a non-glossy portion, and forming a read image (composite image) in which the glossy appearance is reproduced for the glossy region corresponding to the glossy portion, and lowered (whitish) image quality is mitigated for the non-glossy region corresponding to the non-glossy portion.

First, a first target image corresponding to the reading target is extracted from a first read image acquired by optically reading the reading target in a first reading environment (for example, an environment in which the image sensor is directly below the incident position of light, the sensor surface of the image sensor is substantially parallel to the lower surface (the surface on which light from the light source is incident) of the reading target, and the angle of incidence of the incident light emitted from the light source is 45°). The first target image is an image in which lowered image quality of the non-glossy region is mitigated, but the glossy appearance of the glossy region is not well-reproduced.

Additionally, a second target image corresponding to the reading target is extracted from a second read image acquired by optically reading the reading target in a second reading environment in which the specular light acquired from the reading target by the image sensor is of higher intensity compared to the first reading environment (for example, an environment in which the image sensor is directly below the incident position of light, the sensor surface of the image sensor is substantially parallel to the lower surface of the reading target, and the angle of incidence of the incident light emitted from the light source is 5°). The second target image is an image in which the image quality of the non-glossy region is lowered (whitish), but the glossy appearance of the glossy region is well-reproduced.

Thereafter, a composite image is formed by executing a composition process that composites the non-glossy region corresponding to the non-glossy portion extracted from the first target image with the glossy region corresponding to the glossy portion extracted from the second target image.

The composition process described above presumes that the first target image and the second target image are in the same orientation. Here, orientation denotes a concept that encompasses at least one of the position or the direction of the reading target on the platen, and direction may also be thought of as the degree of rotation in the plane parallel to the platen. If the orientations of the first and second target images are different from each other, it may not be possible to obtain a correct composite image through the composition process.

Aspects of non-limiting embodiments of the present disclosure relate to obtaining a composite image in which the non-glossy region of a first target image, which corresponds to the reading target and which is extracted from a first read image obtained in a first reading environment, and the glossy region of the second target image, which corresponds to the reading target and which is extracted from a second read image obtained in a second reading environment in which the specular light acquired from the reading target by the image sensor is of higher intensity compared to the first reading environment, are composited correctly, even if the orientations of the first and seconds target images are different from each other.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including a processor configured to: extract a first target image corresponding to a reading target having a glossy portion and a non-glossy portion from a first read image acquired by optically reading the reading target in a first reading environment, and extract a second target image corresponding to the reading target from a second read image acquired by optically reading the reading target in a second reading environment in which specular light acquired from the reading target by an image sensor is of higher intensity compared to the first reading environment; execute an alignment of the first target image and the second target image if positions of the first and second target images do not coincide with each other and if the first and second target images are alignable by translating or rotating at least one of the first target image or the second target image; and form a composite image by executing a composition process that composites a non-glossy region corresponding to the non-glossy portion extracted from the first target image with a glossy region corresponding to the glossy portion extracted from the second target image.

BRIEF DESCRIPTION OF THE DRAWINGS

An exemplary embodiment of the present disclosure will be described in detail based on the following figures, wherein.

DETAILED DESCRIPTION

Figure 1:
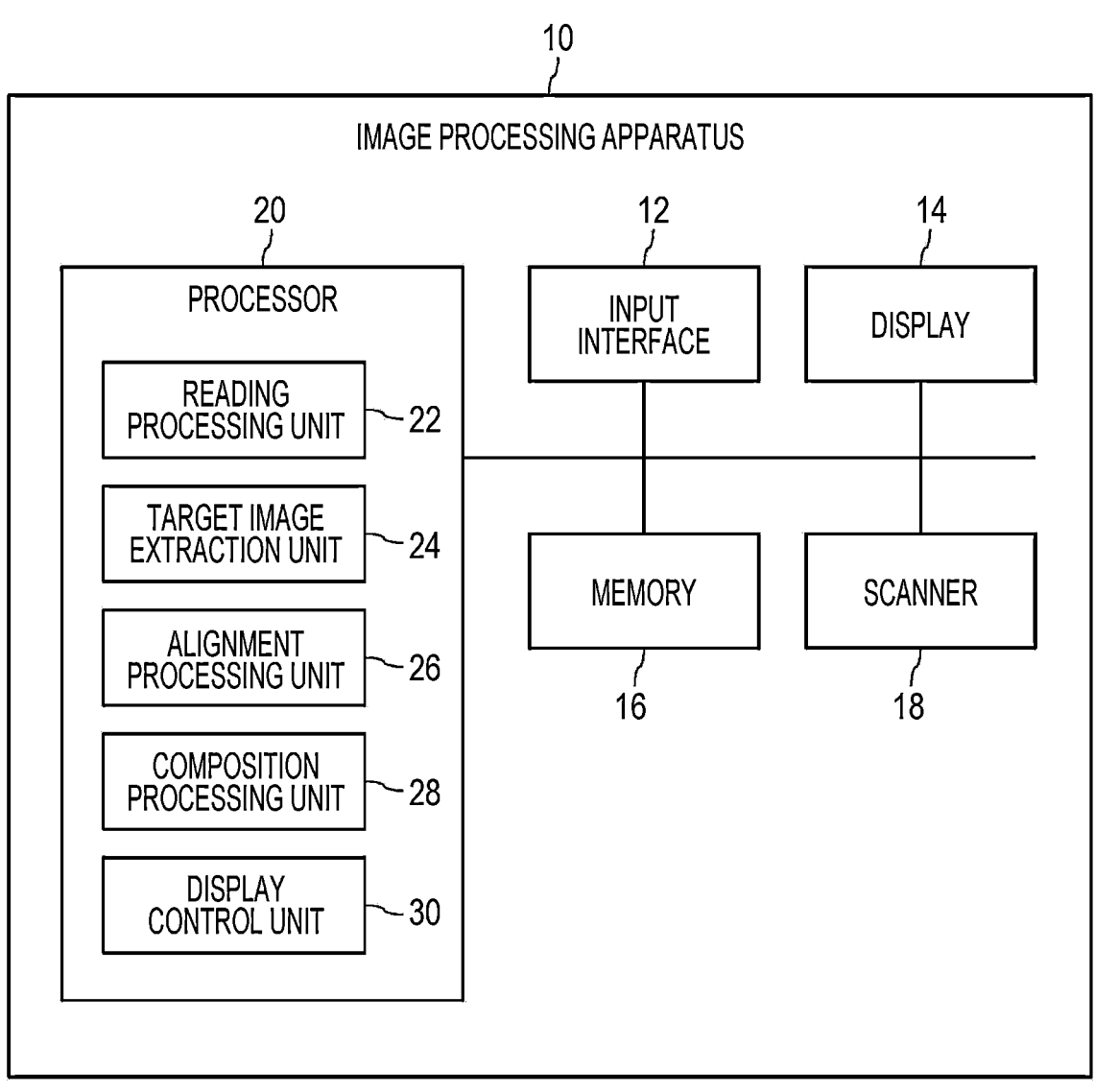
FIG. 1 is a schematic configuration diagram illustrating an image processing apparatus according to the exemplary embodiment.

FIG. 1 is a schematic configuration diagram illustrating an image processing apparatus 10 according to the exemplary embodiment. The image processing apparatus 10 is an image reading apparatus that optically reads a reading target and forms a read image containing an image that corresponds to the reading target. The image reading apparatus is scanner apparatus or a multi-function apparatus including a scanner function, for example.

Figure 2:
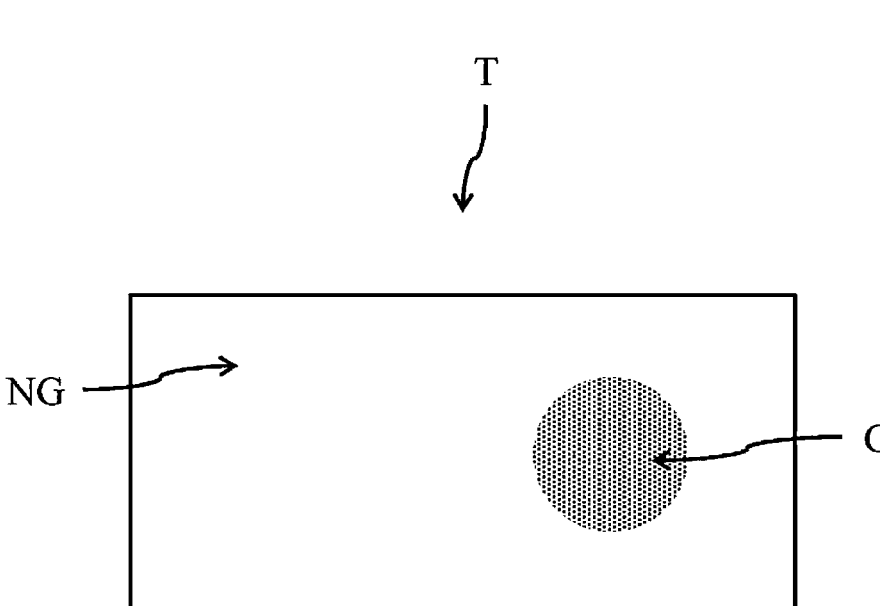
FIG. 2 is a diagram illustrating an example of a reading target.

The target to be imaged is printed material such as paper or the packaging of a snack, for example, but is not limited thereto. FIG. 2 is a diagram illustrating an example of the reading target T. The reading target T has a glossy portion G with strong glossiness and a non-glossy portion NG other than the glossy portion on a reading surface to be read by the image processing apparatus 10. Note that in the diagrams attached to this specification, the glossy portion G of the reading target T, and the glossy region in the read image where a glossy appearance is reproduced, are indicated with shading. As described above, the glossy portion G is the portion where the specular reflectance is equal to or greater than a prescribed reflectance. On the other hand, the non-glossy portion NG is the portion where the specular reflectance is less than the prescribed reflectance.

Although details are described later, the image processing apparatus 10 optically reads the reading target T having the glossy portion G and the non-glossy portion NG, and then forms a read image in which the glossiness of the glossy portion G is reproduced appropriately and in which degraded image quality of the non-glossy portion NG is mitigated.

An input interface 12 includes buttons or a touch panel, for example. The input interface 12 is used by a user to input various instructions into the image processing apparatus 10.

A display 14 includes a liquid crystal display (LCD) panel or an organic light-emitting diode (OLED) panel, for example. Various screens are displayed on the display 14.

A memory 16 includes a hard disk drive (HDD), a solid-state drive (SSD), read-only memory (ROM), or random access memory (RAM), for example. The memory 16 may be provided separately from a processor 20 described later, or at least a portion of the memory 16 may be provided internally to the processor 20. The memory 16 stores an image processing program for causing each unit of the image processing apparatus 10 to operate. Note that the image processing program may also be stored in a non-transitory computer readable storage medium such as Universal Serial Bus (USB) memory or a CD-ROM, for example. The image processing apparatus 10 is capable of reading the image processing program from such a storage medium, and executing the image processing program.

A scanner 18 is a mechanism for optically reading the reading target T and forming a read image. The scanner 18 is capable of reading the reading target T and forming a read image in a first reading environment or a second reading environment, the reading environments being different from each other. Specifically, the first reading environment is a reading environment on par with a typical imaging reading apparatus of the related art, whereas the second reading environment is an environment in which specular light from the reading target T acquired by an image sensor of the scanner 18 is of higher intensity compared to the first reading environment.

Figure 3:
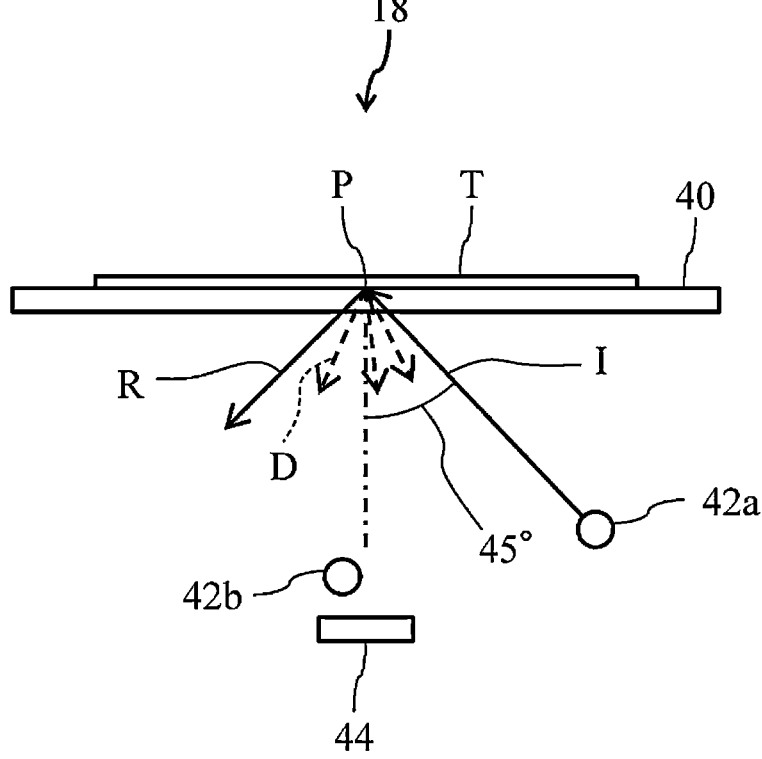
FIG. 3 is a diagram illustrating an example of a first reading environment.

FIG. 3 is a diagram illustrating an example of the first reading environment. Before describing the differences between the first reading environment and the second reading environment, the structure of the scanner 18 will be described. The scanner 18 includes a platen 40, a first light source 42a, a second light source 42b, and an image sensor 44.

The platen 40 is a plate-like member formed using a light-transmissive material such as glass, for example, and disposed extending in the horizontal plane. The reading target T is placed on the platen 40.

The first light source 42a and the second light source 42b are each formed using a light-emitting element array in which light-emitting elements, such as white fluorescent lamps for example, are arranged in the horizontal direction (in the example in FIG. 3, the depth direction relative to the plane of the page). The first light source 42a and the second light source 42b are provided below the platen 40 and emit light toward the front reading surface (that is, the lower surface) of the reading target T.

The image sensor 44 is formed from an image sensor element array in which image sensor elements that convert light into an electrical signal, such as charge-coupled device (CCD) sensor elements for example, are arranged in the horizontal direction, specifically the same direction as arrangement direction of the light-emitting elements (in the example in FIG. 3, the depth direction relative to the plane of the page). The image sensor 44 receives reflected light, from the reading surface of the reading target T, of the light irradiating the reading target T from the first light source 42a or the second light source 42b. The image sensor 44 is also provided below the platen 40. In particular, in the exemplary embodiment, the image sensor 44 is disposed directly below the reading target T, and more particularly, directly below an incident position P where the light from the first light source 42a and the second light source 42b is incident. The image sensor 44 is also provided such that its light-receiving surface is parallel to the platen 40 (that is, the reading target T placed on the platen 40). With this arrangement, the image sensor 44 receives reflected light that travels in the perpendicular direction from the incident position P of the reading target T.

During the process of scanning the reading target T, the first light source 42a, the second light source 42b, and the image sensor 44 move as one in the horizontal direction (in the example in FIG. 3, the left direction) perpendicular to the arrangement direction of the light-emitting elements and the image sensor elements. With this configuration, the incident position P is scanned, and the image sensor 44 receives reflected light from each portion of the reading target T. The scanner 18 forms a read image expressing the reading target T on the basis of the reflected light received by the image sensor 44.

The structure of the scanner 18 is as described above. Hereinafter, the first reading environment and the second reading environment will be described.

In the first reading environment illustrated in FIG. 3, the first light source 42a is used and the second light source 42b is not used. The first light source 42a is disposed such that the angle of incidence, namely the angle obtained between the direction of travel of incident light I emitted from the first light source 42a and the perpendicular direction (the direction indicated by the chain line in FIG. 3) relative to the reading target T placed on the platen 40, is 45°. With this arrangement, the angle of reflection (the angle obtained with respect to the perpendicular direction relative to the reading target T placed on the platen 40) of specular light R reflected from the reading surface (specifically, the incident position P) of the reading target T is also 45°. Consequently, the image sensor 44, which is disposed to receive reflected light that travels in the perpendicular direction from the incident position P of the incident light I on the reading target T, receives little or none of the specular light R of the light from the first light source 42a. In other words, in the first reading environment, the intensity of the specular light R from the reading target T acquired by the image sensor 44 may be said to be less than a prescribed specular light intensity threshold value.

On the other hand, as indicated by the dashed lines in FIG. 3, diffuse light D of the light from the first light source 42a is reflected at various angles of reflection from the incident position P on the reading target T. Consequently, the image sensor 44 receives more (at least a higher intensity than the intensity of the specular light R) of the diffuse light D of the light from the first light source 42a. That is, in the first reading environment, the image sensor 44 forms a read image mostly on the basis of the diffuse light D. In this specification, the read image formed in the first reading environment is designated the first read image.

Figure 4:
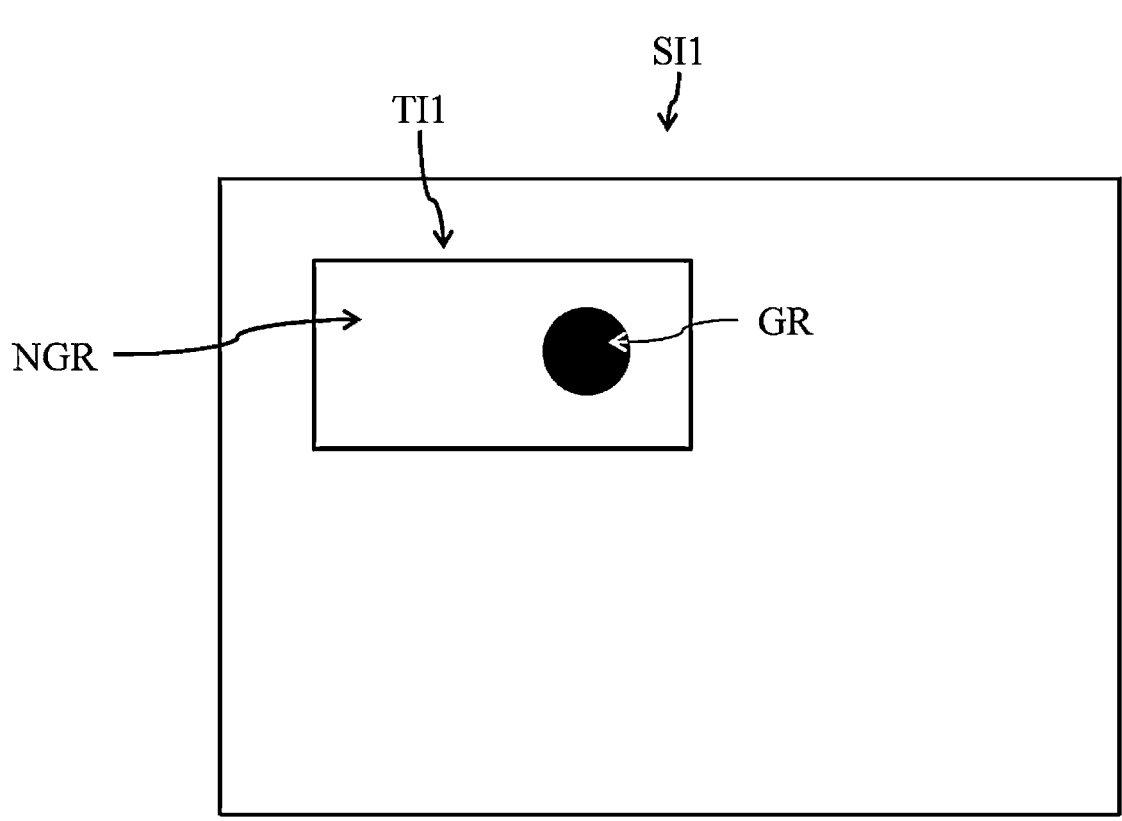
FIG. 4 is a diagram illustrating an example of a first read image.

FIG. 4 is a diagram illustrating an example of a first read image SI1. In the first reading environment, the first read image SI1 is formed mostly on the basis of the diffuse light D. Consequently, as described above, in the first read image SI1, variations in the image quality of the first read image SI1 due to the surface characteristics of the reading target T are mitigated, and a non-glossy region NGR corresponding to the non-glossy portion NG of the reading target T is of high image quality (for example, the luminance, brightness, and saturation of pixels in the non-glossy region NGR are values suitable for reproducing the non-glossy portion NG). On the other hand, the reflected light from the glossy portion G of the reading target T includes specular light R of high intensity and diffuse light D of low intensity, and therefore in the first read image SI1, diffuse light D of sufficient intensity may not be obtained from the glossy portion G of the reading target T. Consequently, a glossy region GR corresponding to the glossy portion G of the reading target T is darkened, and the glossy appearance of the glossy region GR is not reproduced appropriately. In particular, the brightness of pixels in the glossy region GR is lowered considerably. In FIG. 4, the glossy region GR is painted black to illustrate the above situation.

Note that in the exemplary embodiment, the first reading environment is configured such the image sensor 44 is disposed to receive reflected light that travels in the perpendicular direction from the incident position P of the incident light I on the reading target T and the angle of incidence of the incident light I from the first light source 42a is set to 45°, but the angle of incidence of the incident light I from the first light source 42a and the placement of the image sensor 44 are not limited to the above configuration insofar as the intensity of the specular light R from the reading target T acquired by the image sensor 44 is less than a prescribed specular light intensity threshold value.

Figure 5:
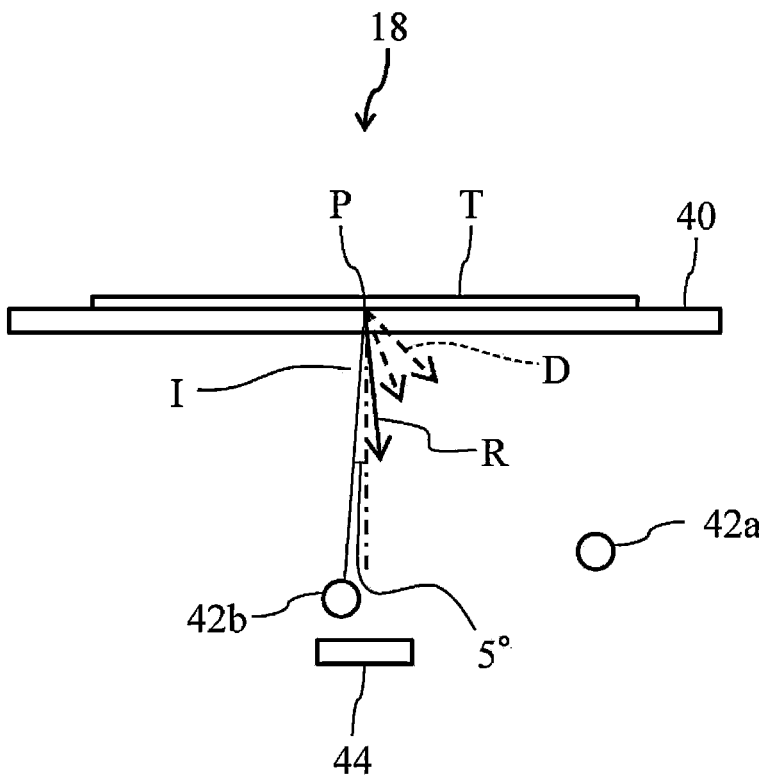
FIG. 5 is a diagram illustrating an example of a second reading environment.

On the other hand, in the second reading environment illustrated in FIG. 5, the first light source 42a is not used and the second light source 42b is used. The second light source 42b is disposed such that the angle of incidence, namely the angle obtained between the direction of travel of incident light I emitted from the second light source 42b and the perpendicular direction (the direction indicated by the chain line in FIG. 5) relative to the reading target T placed on the platen 40, is 5°. With this arrangement, the angle of reflection (the angle obtained with respect to the perpendicular direction relative to the reading target T placed on the platen 40) of specular light R reflected from the reading surface (specifically, the incident position P) of the reading target T is also 5°. Consequently, the image sensor 44, which is disposed to receive reflected light that travels in the perpendicular direction from the incident position P of the incident light I on the reading target T, receives the specular light R of the light from the first light source 42a. In other words, in the second reading environment, the intensity of the specular light R from the reading target T acquired by the image sensor 44 may be said to be equal to or greater than a prescribed specular light intensity threshold value. At the least, in the second reading environment, the specular light R from the reading target T acquired by the image sensor 44 is of higher intensity compared to the first reading environment.

In the second reading environment, too, the image sensor 44 receives diffuse light D. Consequently, in the second reading environment, the image sensor 44 forms a read image on the basis of the specular light R and the diffuse light D. In this specification, the read image formed in the second reading environment is designated the second read image.

Figure 6:
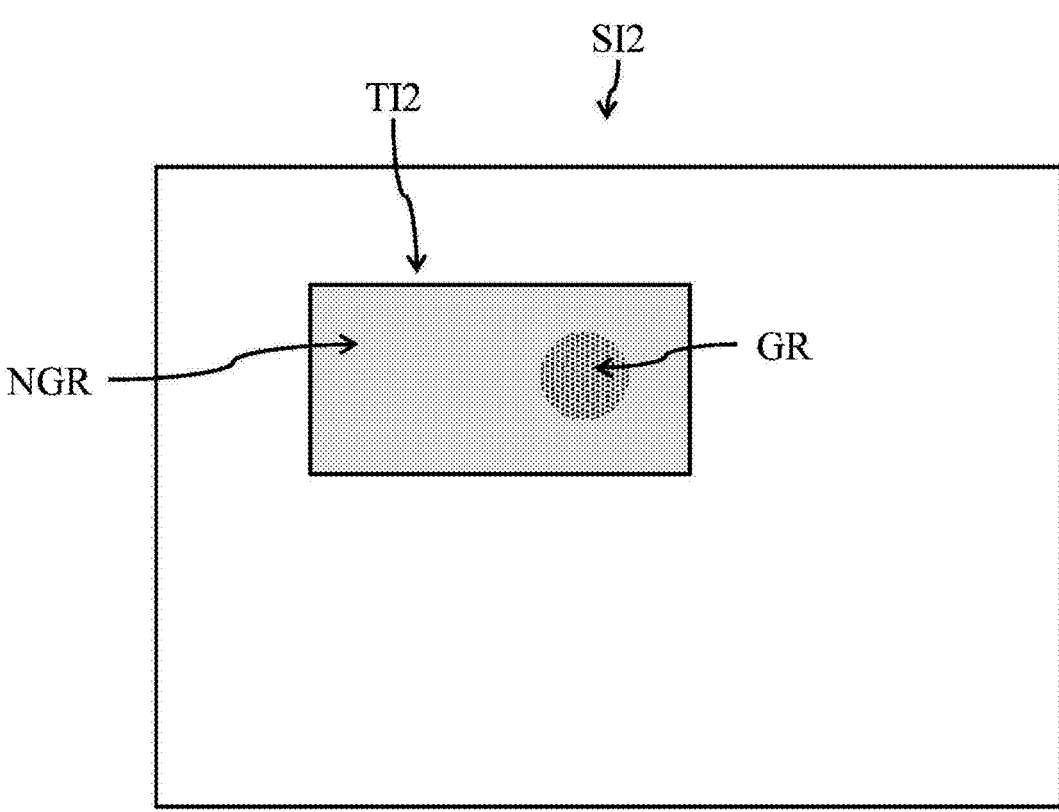
FIG. 6 is a diagram illustrating a first example of a second read image.

FIG. 6 is a diagram illustrating an example of a second read image SI2. In the second reading environment, the second read image SI2 is formed on the basis of reflected light that includes specular light R. Consequently, in the second read image SI2, the glossy appearance of the glossy region GR corresponding to the glossy portion G of the reading target T reproduced at least better than the first read image SI1. That is, since specular light R of high intensity is reflected from the glossy portion G and received by the image sensor 44, the brightness of pixels in the glossy region GR is considerably higher. This is one factor responsible for the appropriate reproduction of a glossy appearance. Note that not only the brightness but also the saturation, hue, and the like of the pixels are thought to be involved in the favorable reproduction of a glossy appearance. In any case, the reason why the glossy appearance of the glossy region GR is reproduced appropriately is that the image sensor 44 forms the second read image SI2 mostly on the basis of the specular light R from the reading target T. On the other hand, in general, the scanner 18 is adjusted so that the image quality of the non-glossy region NGR is appropriate when forming a read image on the basis of the diffuse light D, whereas for the second read image SI2, the second read image SI2 is formed on the basis of not only the diffuse light D but also the specular light R. Accordingly, the non-glossy region NGR corresponding to the non-glossy portion NG of the reading target T is whitish, and the image quality of the non-glossy region NGR is poor (for example, the brightness of pixels in the non-glossy region NGR is too high) compared to the first read image SI1.

Note that in the exemplary embodiment, the second reading environment is configured such the image sensor 44 is disposed to receive reflected light that travels in the perpendicular direction from the incident position P of the incident light I on the reading target T and the angle of incidence of the incident light I from the second light source 42b is set to 5°, but the angle of incidence of the incident light I from the second light source 42b and the placement of the image sensor 44 are not limited to the above configuration insofar as the intensity of the specular light R from the reading target T acquired by the image sensor 44 is equal to or greater than a prescribed specular light intensity threshold value, or the intensity of the specular light R from the reading target T acquired by the image sensor 44 is the same or higher compared to in the first reading environment.

Returning to FIG. 1, the processor 20 refers to a processing device in a broad sense, and includes at least one general processing device (such as a central processing unit (CPU), for example) or dedicated processing device (such as a graphics processing unit (GPU), an application-specific integrated circuit (ASIC), a field-programmable gate array (FPGA), or a programmable logic device, for example). The processor 20 may not only be a single processing device, but may also be achieved by the cooperation of multiple processing devices existing in apparatuses located physically apart from each other. As illustrated in FIG. 1, the processor 20 exhibits the functions of a reading processing unit 22, a target image extraction unit 24, an alignment processing unit 26, a composition processing unit 28, and a display control unit 30 according to the image processing program stored in the memory 16.

The reading processing unit 22 controls the scanner 18 to optically read the reading target T in response to a read instruction received from the user who has set the reading target T on the platen 40. Specifically, the reading processing unit 22 controls the scanner 18 to read the reading target T in the first reading environment (in the exemplary embodiment, using the first light source 42*a*) and acquire the first read image SI1, and then read the reading target T in the second reading environment (in the exemplary embodiment, using the second light source 42*b*) and acquire the second read image SI2. Note that the first read image SI1 and the second read image SI2 may also be acquired in the reverse order.

At this point, the orientation of the reading target T may have changed between the reading process in the first reading environment and the reading process in the second reading environment. For example, in some cases, the reading target T may move or the orientation of the reading target T may change in a manner not intended by the user. As described above, in this specification, orientation denotes a concept that encompasses at least one of the position or the direction of the reading target T on the platen 40, and direction may also be thought of as the degree of rotation in the plane parallel to the platen 40.

In other cases, the user may change the orientation of the reading target T intentionally. For example, in the case of a reading target T having an uneven reading surface or a reading target T having a hologram printed thereon, the read images may be different (for example, shadows may appear in mutually different ways, or mutually different images may be obtained) when light is cast from a first-direction side (in the example in FIG. 3 or 5, the right side) of the reading target T and when light is cast from a second-direction side (in the example in FIG. 3 or 5, the left side) opposite the first-direction side. Additionally, the first light source 42*a*, the second light source 42*b*, and the image sensor 44 in the scanner 18 are assumed to move only in one direction (for example, in FIG. 3 or 5, only from right to left) when reading. In this case, to change the direction from which light is cast onto the reading target T, first, the user sets the reading target T so that light is cast from the first-direction side of the reading target T, and a first read image SI1 #1 is acquired in the first reading environment; next, the user changes the orientation of the reading target T (by rotating 180 degrees, for example) so that light is cast from the second-direction side of the reading target T, and a first read image SI1 #2 is acquired in the first reading environment. Thereafter, a second read image SI2 #1 with light being cast from the first-direction side of the reading target T and a second read image SI2 #2 with light being cast from the second-direction side of the reading target T are acquired in the second reading environment by similarly changing the orientation of the reading target T partway through reading. In this case, the orientation of the reading target T naturally changes between the reading process in the first reading environment and the reading process in the second reading environment. Note that in this case, a composite image of the first read image SI1 #1 and the second read image SI2 #1 is formed, and a composite image of the first read image SI1 #2 and the second read image SI2 #2 is formed. A process of forming a composite image will be described later.

The target image extraction unit 24 extracts an image corresponding to the reading target T from the first read image SI1 (see FIG. 4) acquired by the scanner 18. In this specification, the extracted image is designated the first target image TI1. The method of extracting the first target image TI1 from the first read image SI1 may be implemented using known technology (such as edge extraction, for example), and therefore a description is omitted. The target image extraction unit 24 also extracts an image corresponding to the reading target T from the second read image SI2 (see FIG. 6) acquired by the scanner 18. In this specification, the extracted image is designated the second target image TI2. If the orientation of the reading target T is changed between the reading process in the first reading environment and the reading process in the second reading environment, the position of the first target image TI1 and the position of the second target image TI2 will differ from each other. Herein, the position of the (first or second) target image means the coordinate region occupied by the target image in the read image.

Figure 7:
FIG. 7 is a diagram illustrating a second example of the second read image.
Figure 7:
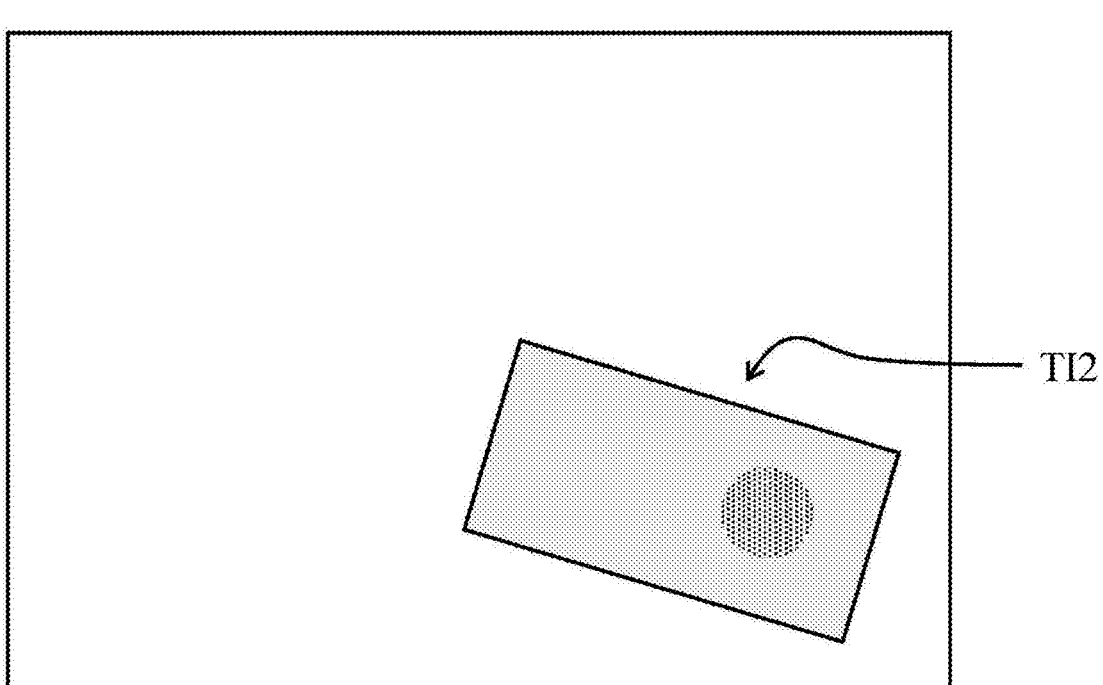

The alignment processing unit 26 determines whether the position of the first target image TI1 and the position of the second target image TI2 coincide. This determination may be made by comparing the position (coordinate region) of the first target image TI1 to the position of the second target image TI2. If the positions do not coincide, it is determined whether the first target image TI1 and the second target image TI2 are alignable by translating or rotating at least one of the first target image TI1 or the second target image TI2. The determination process performed by the alignment processing unit 26 will be described by taking an example in which the first target image TI1 is in the position illustrated in FIG. 4 and the second target image TI2 is in the position illustrated in FIG. 7.

Figure 8:
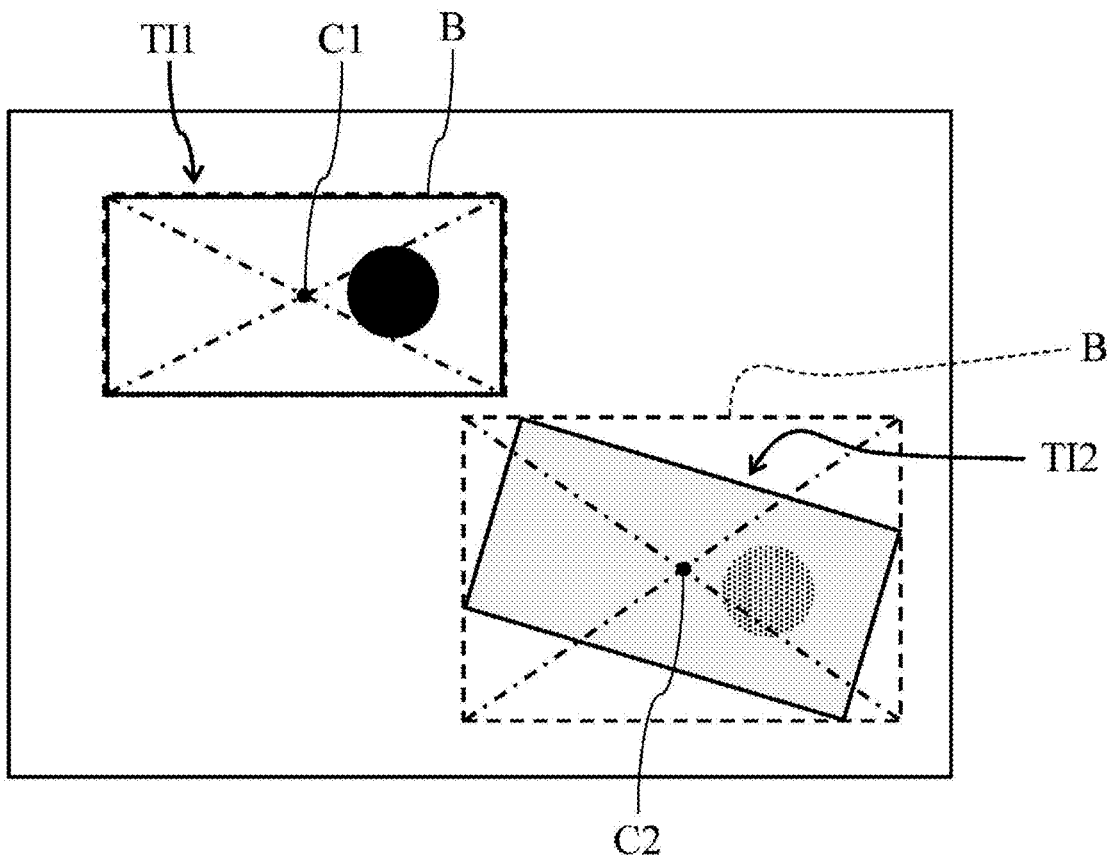
FIG. 8 is a diagram illustrating the centers of gravity of a first target image and a second target image.

First, the alignment processing unit 26 specifies the position of a center of gravity C1 of the first target image TI1. In the exemplary embodiment, as illustrated in FIG. 8, the alignment processing unit 26 first specifies a bounding rectangle B of the first target image TI1, and specifies the coordinates at the intersection point of the diagonals of the bounding rectangle B as the position of the center of gravity C1. Similarly, the alignment processing unit 26 specifies the position of a center of gravity C2 of the second target image TI2.

Figure 9:
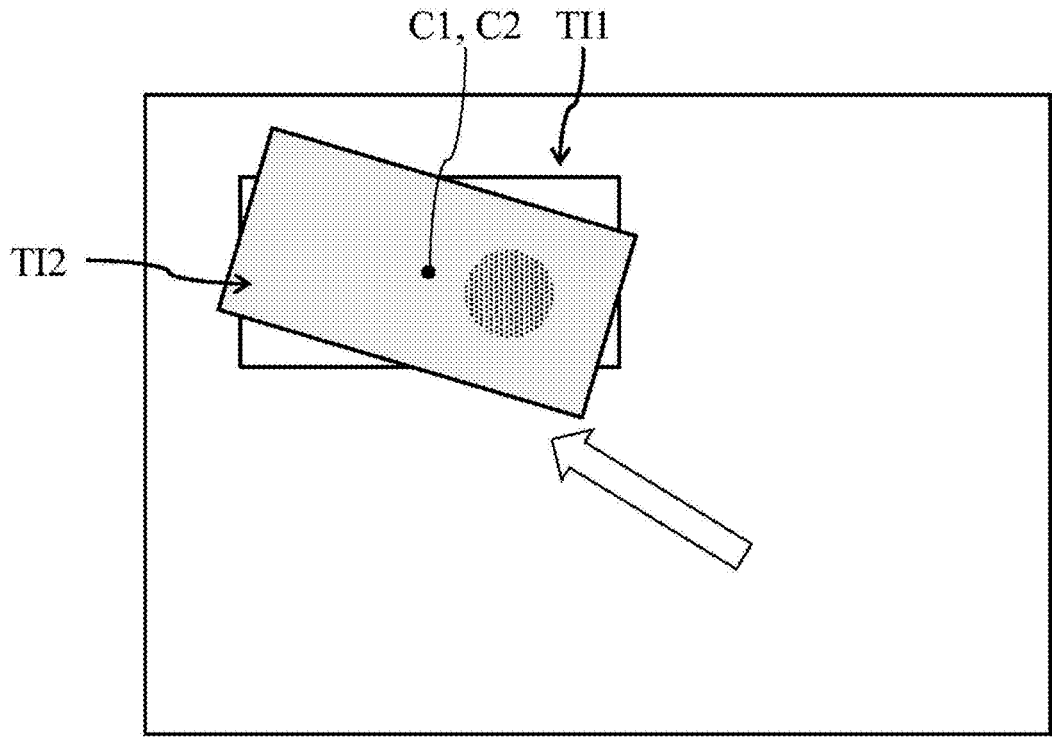
FIG. 9 is a diagram illustrating how a process of aligning the center of gravity of the first target image and the center of gravity of the second target image works.

Next, the alignment processing unit 26 translates at least one of the first target image TI1 or the second target image TI2 in the coordinate plane of the read image so that the centers of gravity C1 and C2 are aligned. Here, as illustrated in FIG. 9, the alignment processing unit 26 translates the second target image TI2. Note that if the centers of gravity C1 and C2 are in the same position from the start, the alignment processing unit 26 does not have to translate at least one of the first target image TI1 or the second target image TI2.

Next, the alignment processing unit 26 performs a pattern matching process between the first target image TI1 and the second target image TI2 with the centers of gravity C1 and C2 in the coinciding state. The pattern matching process likewise may be implemented using known technology, and therefore a detail description is omitted here. If the edges (outer frames) of the first target image TI1 and the second target image TI2 coincide as a result of the pattern matching process, the alignment processing unit 26 determines that the first target image TI1 and the second target image TI2 are alignable.

Figure 10:
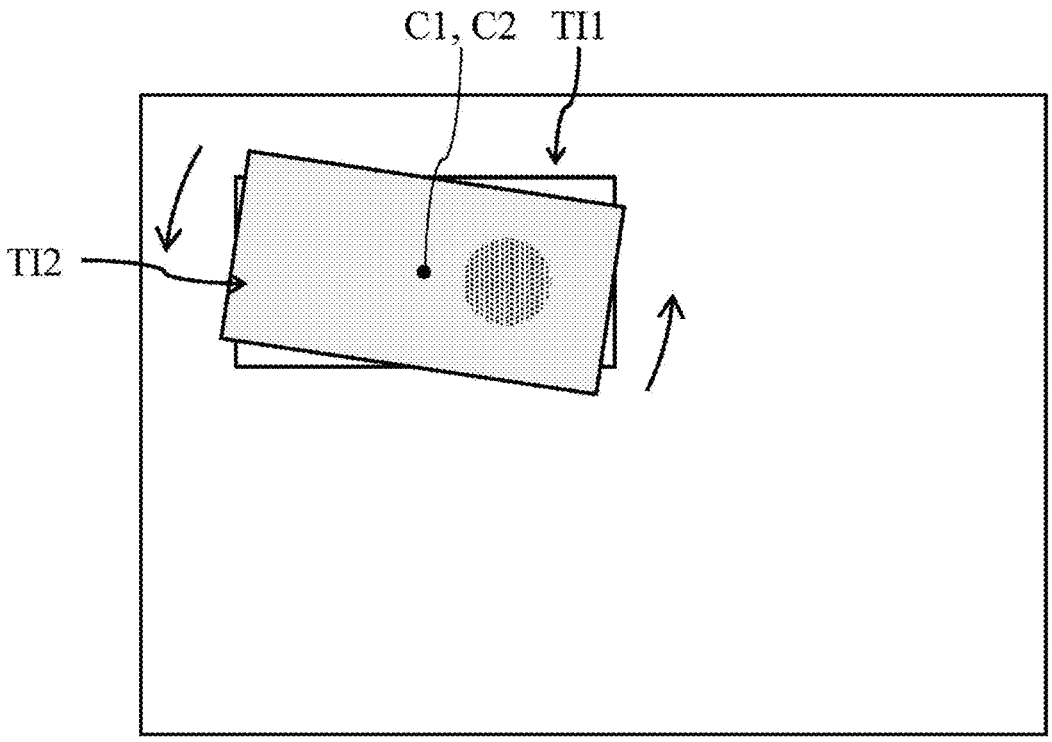
FIG. 10 is a diagram illustrating how a process of rotating the second target image works.

If the edges of the first target image TI1 and the second target image TI2 do not coincide after causing the centers of gravity C1 and C2 to coincide, the alignment processing unit 26 rotates one of the first target image TI1 or the second target image TI2 by a slight angle about its center of gravity C1 or C2, and determines whether the edges of the first target image TI1 and the second target image TI2 coincide after the rotation. Here, as illustrated in FIG. 10, the alignment processing unit 26 rotates the second target image TI2 about the center of gravity C2. If the edges of the first target image TI1 and the second target image TI2 coincide after rotation, the alignment processing unit 26 determines that the first target image TI1 and the second target image TI2 are alignable. The alignment processing unit 26 repeatedly rotates one of the first target image TI1 or the second target image TI2 and determines whether the edges of the first target image TI1 and the second target image TI2 coincide until the edges coincide. If the edges of the first target image TI1 and the second target image TI2 do not coincide during a full rotation of one of the first target image TI1 or the second target image TI2, the alignment processing unit 26 determines that the first target image TI1 and the second target image TI2 are not alignable.

Figure 11:
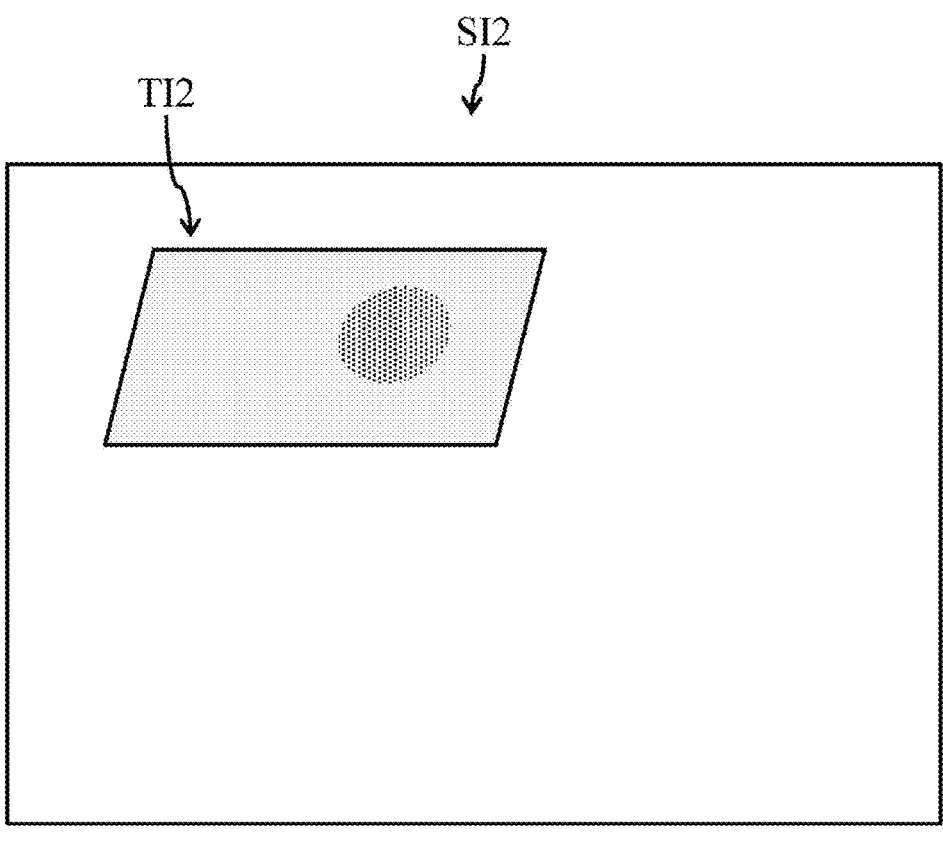
FIG. 11 is a diagram illustrating a first example of the second read image in a case where alignment is unavailable.
Figure 12:
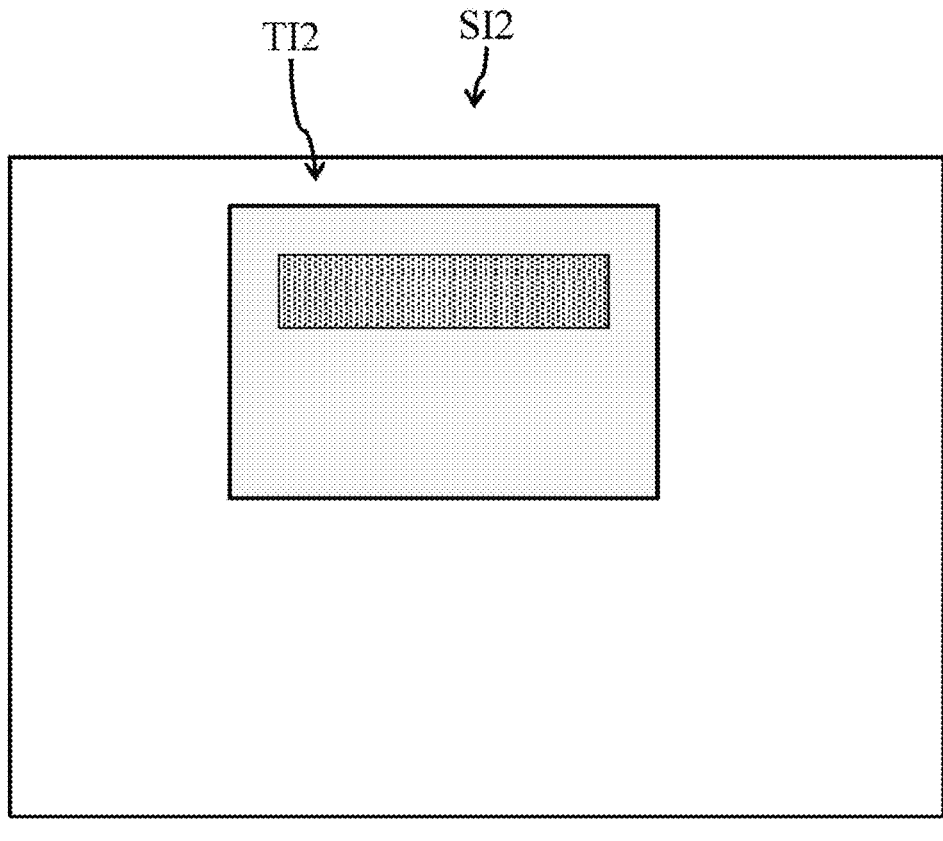
FIG. 12 is a diagram illustrating a second example of the second read image in a case where alignment is unavailable.
Figure 13:
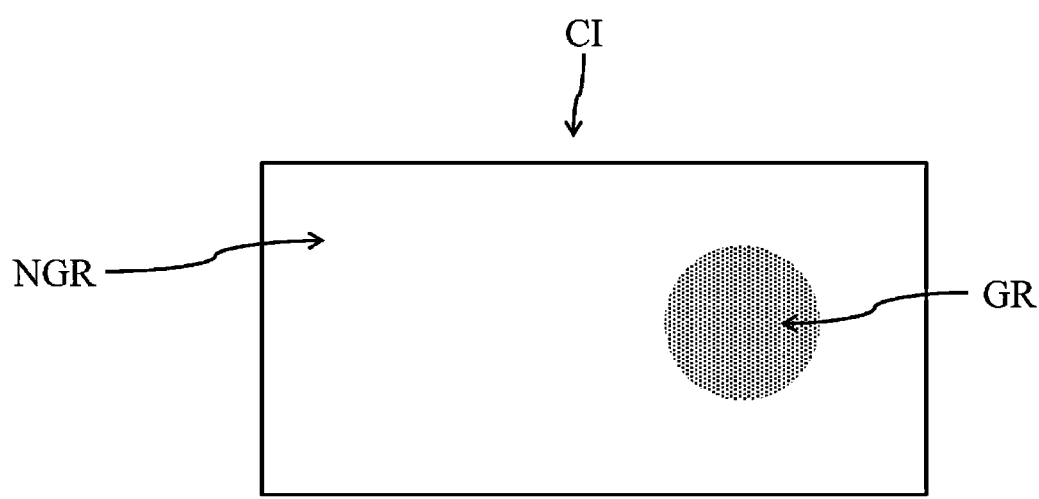
FIG. 13 is a diagram illustrating an example of a composite image.

Note that one example of the case in which the first target image TI1 and the second target image TI2 are not alignable is the case in which the first target image TI1 is the one illustrated in FIG. 4, but the second target image TI2 is distorted, as illustrated in FIG. 11. Another example is the case in which the first target image TI1 is the one illustrated in FIG. 4, but as illustrated in FIG. 12, the reading target T indicated by the first target image TI1 and the reading target T indicated by the second target image TI2 are different to begin with (the case in which the reading target T is replaced between the reading process in the first reading environment and the reading process in the second reading environment).

In the case of determining that the first target image TI1 and the second target image TI2 are alignable, the alignment processing unit 26 executes alignment of the first target image TI1 and the second target image TI2 according to the process described above (that is, the process in which at least one of the first target image TI1 or the second target image TI2 is translated so that the center of gravity C1 and the center of gravity C2 are aligned, and if necessary, one of the first target image TI1 or the second target image TI2 is rotated). On the other hand, in the case of determining that the first target image TI1 and the second target image TI2 are not alignable, the alignment processing unit 26 does not execute alignment of the first target image TI1 and the second target image TI2.

The alignment processing unit 26 may also determine whether the first target image TI1 and the second target image TI2 are alignable after reducing the first target image TI1 and the second target image TI2 by the same scaling factor. This configuration makes it possible to reduce the computational complexity for determining whether the first target image TI1 and the second target image TI2 are alignable, and speed up the determination process.

First, the composition processing unit 28 executes a process of discriminating the glossy region GR from the non-glossy region NGR in the first target image TI1. The discrimination process may be performed according to any of various methods. For example, as described above, in the first target image TI1, the pixel values in the non-glossy region NGR and the pixel values in the glossy region GR differ considerably (the brightness of the glossy region GR is considerably lower compared to the non-glossy region NGR). Therefore, the composition processing unit 28 may discriminate the glossy region GR from the non-glossy region NGR on the basis of the brightness of each pixel forming the first target image TI1. Moreover, a learner (such as SegNet, for example) may be pre-trained on the basis of an input image to discriminate the glossy region GR from the non-glossy region NGR in the input image, and the glossy region GR may be discriminated from the non-glossy region NGR by inputting the first target image TI1 into the trained learner. Alternatively, the user may specify the glossy region GR manually in the first target image TI1, and the composition processing unit 28 may treat the region specified by the user as the glossy region GR and treat the remaining region as the non-glossy region NGR.

If the first target image TI1 and the second target image TI2 are aligned, the coordinate regions of the glossy region GR and the non-glossy region NGR in the first target image TI1 may be treated as the glossy region GR and the non-glossy region NGR in the second target image TI2. On the other hand, as described later, the composition processing unit 28 may form a composite image in some cases even if the first target image TI1 and the second target image TI2 are not alignable. In such cases, the composition processing unit 28 separately executes a process of discriminating the glossy region GR from the non-glossy region NGR in the second target image TI2, too, according to a process similar to the process described above.

Next, the composition processing unit 28 executes a composition process of compositing the non-glossy region NGR of the first target image TI1 with the glossy region GR of the second target image TI2.

At this point, if the first target image TI1 and the second target image TI2 have been aligned by the alignment processing unit 26, a composite image CI is formed by the composition process such that the glossy region GR of the second target image TI2 just fits into the portion where the glossy region GR exists in the first target image TI1.

The composite image CI is a read image in which the glossiness of the glossy portion G of the reading target T is reproduced appropriately and in which degraded image quality of the pixels corresponding to the non-glossy portion NG of the reading target T is mitigated. In this way, according to the exemplary embodiment, it is possible to form an appropriate composite image CI even if the orientations of the first target image TI1 and the second target image TI2 are different from each other.

Figure 14:
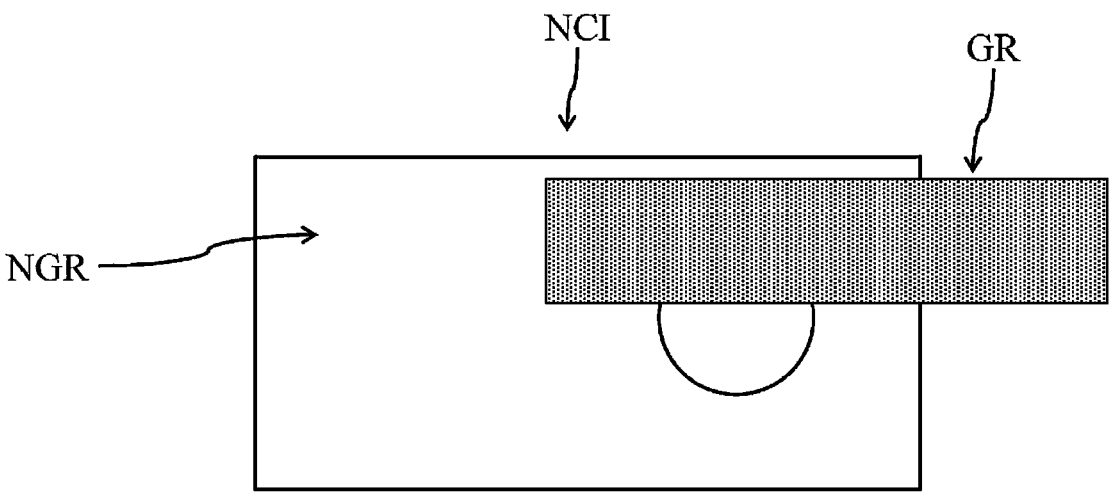
FIG. 14 is a diagram illustrating an example of a non-aligned composite image.

On the other hand, the composition processing unit 28 may execute the composition process described above even if alignment of first target image TI1 and the second target image TI2 is not executed. However, in this case, the composition process simply composites the non-glossy region NGR of the first target image TI1 at the original position (that is, the non-aligned position) with the glossy region GR of the second target image TI2 at the original position, as illustrated in FIG. 14. In this specification, the composite image obtained by such a composition process is designated the non-aligned composite image NCI to distinguish it from the aligned composite image CI.

The non-aligned composite image NCI may be formed not only when the first target image TI1 and the second target image TI2 are not alignable, but also when the first target image TI1 and the second target image TI2 are alignable. In this case, the composition processing unit 28 composites the non-glossy region NGR of the first target image TI1 before alignment with the glossy region GR of the second target image TI2 before alignment to form the non-aligned composite image NCI. As described later, in the case in which the first target image TI1 and the second target image TI2 are alignable, the composite image CI and the non-aligned composite image NCI both may be presented to the user to show the difference between the two composite images.

Note that if the positions of the first target image TI1 and the second target image TI2 already coincide before performing alignment, the composition processing unit 28 may simply generate the composite image CI as-is.

The display control unit 30 executes a process of causing the display 14 to display various screens. In particular, the display control unit 30 causes the display 14 to display the composite image CI formed by the composition processing unit 28. The user, after checking the composite image CI displayed on the display 14, may input an instruction to create an image data file (such as a bitmap (BMP) file or a JPEG file, for example) of the composite image CI. The composition processing unit 28, upon receiving the creation instruction from the user, creates an image data file of the composite image CI. The image data file may be provided to the user directly or transferred to a printer for printing.

Figure 15:
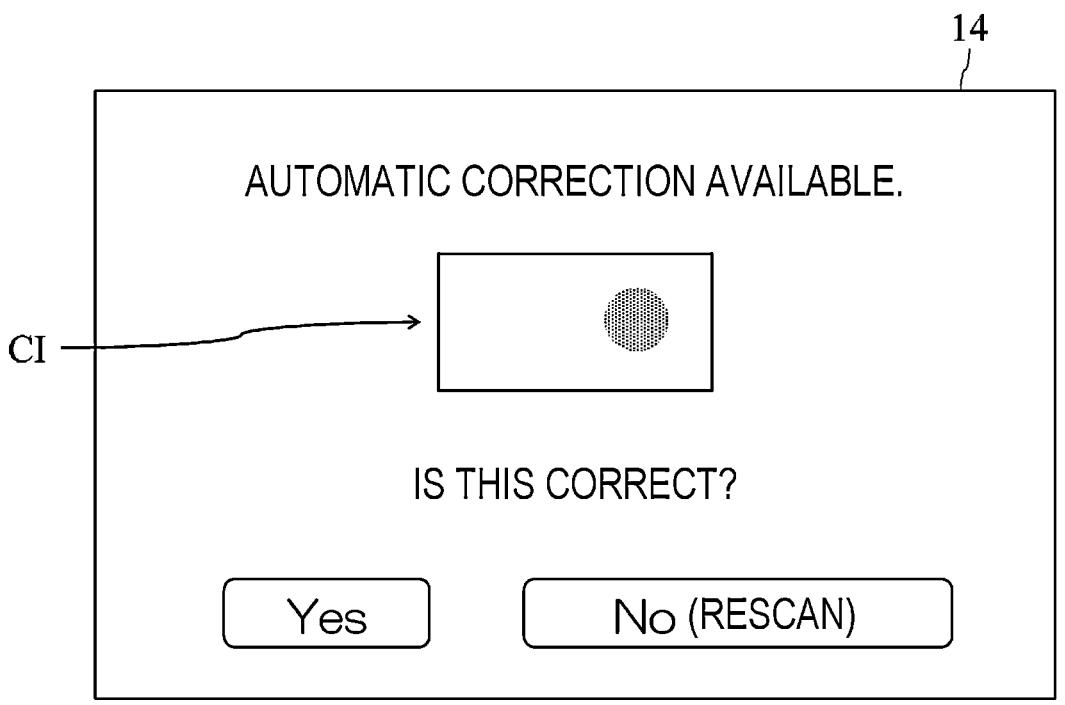
FIG. 15 is a diagram illustrating a first example of a screen displayed on a display in a case where alignment is available.

FIG. 15 is a diagram illustrating a first example of a screen displayed on the display 14 in a case where the first target image TI1 and the second target image TI2 are alignable. If the first target image TI1 and the second target image TI2 are alignable, the display control unit 30 causes the display 14 to display the composite image CI.

Figure 16:
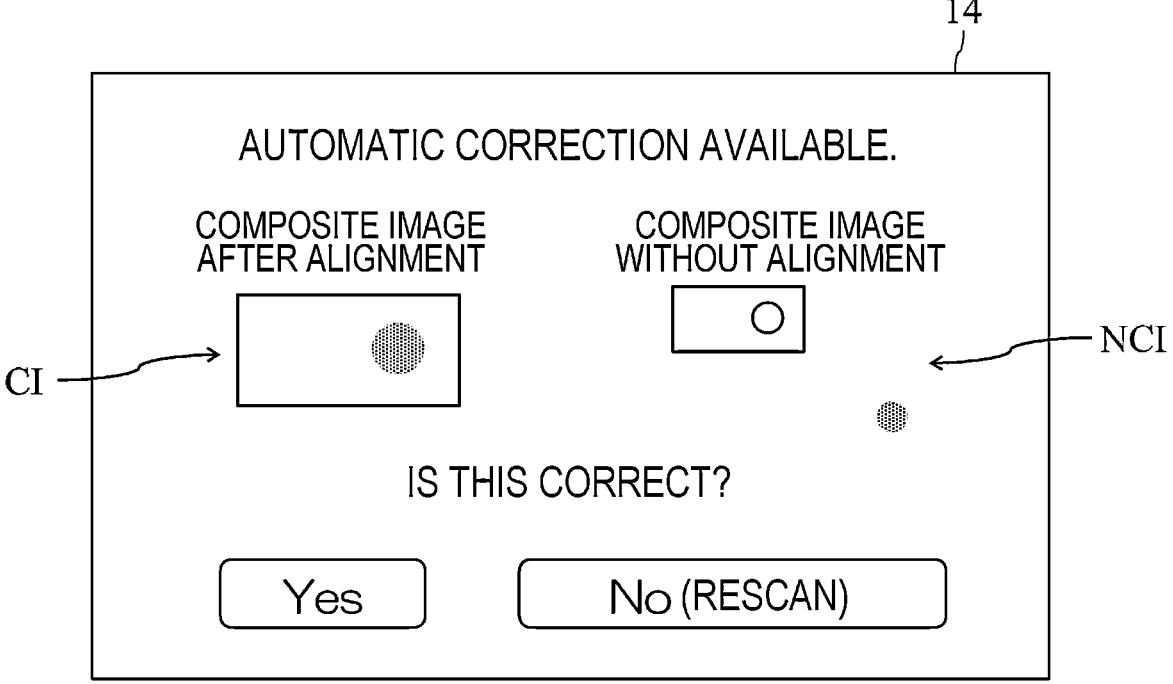
FIG. 16 is a diagram illustrating a second example of a screen displayed on the display in a case where alignment is available.

Also, FIG. 16 is a diagram illustrating a second example of a screen displayed on the display 14 in a case where the first target image TI1 and the second target image TI2 are alignable. As illustrated in FIG. 16, the display control unit 30 may cause the display to display the composite image CI together with the non-aligned composite image NCI formed by having the composition processing unit 28 perform the composition process before executing alignment of the first target image TI1 and the second target image TI2. This arrangement allows the user to easily grasp the difference between the composite images (composite image CI and non-aligned composite image NCI) before and after alignment.

Also, if the composite image CI is simply displayed on the display 14, the user may be unable to grasp whether the displayed image is the composite image CI or the non-aligned composite image NCI in some cases. Therefore, if the first target image TI1 and the second target image TI2 are alignable by the alignment processing unit 26, the display control unit 30 may notify the user that alignment is available. In the exemplary embodiment, as illustrated in FIG. 15 or 16, the display control unit 30 causes the display 14 to display text such as "Automatic correction available." to notify the user that alignment is available. Note that the notification may also be given according to a different method. For example, the user may also be notified with speech or sound output instead of, or in addition to, displaying the above text on the display 14.

Also, on the screen displayed on the display 14 in the case in which the first target image TI1 and the second target image TI2 are alignable, the display control unit 30 may display the composite image CI together with a Yes button and a No button. The Yes button is associated with an instruction to create an image data file. If the user operates the Yes button, the composition processing unit 28 creates an image data file of the composite image CI in response to the creation instruction from the user. In this way, in the exemplary embodiment, if the first target image TI1 and the second target image TI2 are alignable, the composition processing unit 28 forms the composite image CI, and then waits for an instruction from the user to create an image data file of the composite image CI.

In the exemplary embodiment, the No button is associated with an instruction to reacquire at least one of the first target image TI1 or the second target image TI2. Accordingly, if the user operates the No button, an instruction is given (in other words, the processor 20 receives the instruction) to reacquire at least one of the first target image TI1 or the second target image TI2 prior to creating an image data file of the composite image CI. On the basis thereof, the reading processing unit 22 reacquires at least one of the first read image SI1 or the second read image SI2. Prior to the reacquisition of at least one of the first read image SI1 or the second read image SI2, the display control unit 30 may also be configured to notify the user to check the orientation of the reading target T.

Note that in some cases, the user may desire to reacquire at least one of the first target image TI1 or the second target image TI2 even if the first target image TI1 and the second target image TI2 are alignable. For example, in some cases, the composite image CI may not be the image that the user is expecting. Moreover, cases where the alignment accuracy is lacking may not be ruled out, and there is a possibility that a composite image CI of low accuracy may be generated in some cases. In the light of such circumstances, in the exemplary embodiment, the No button is also provided on the screen displayed on the display 14 in cases where the first target image TI1 and the second target image TI2 are alignable.

Figure 17:
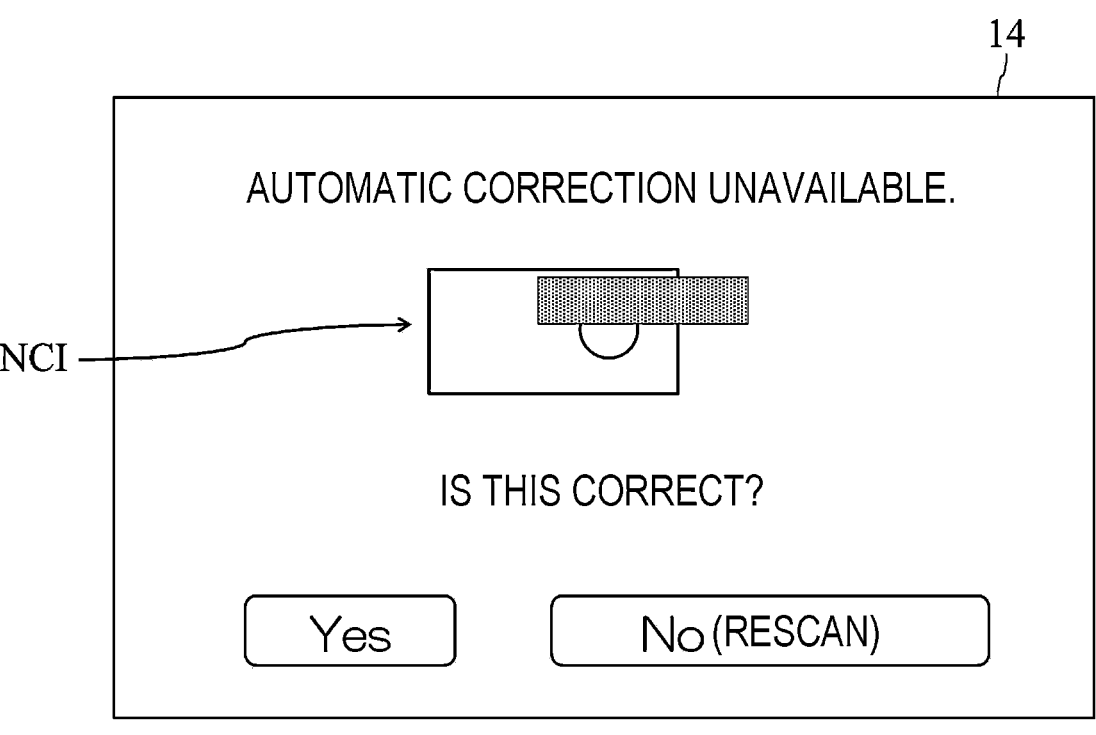
FIG. 17 is a diagram illustrating an example of a screen displayed on the display in a case where alignment is unavailable.

FIG. 17 is a diagram illustrating an example of a screen displayed on the display 14 in a case where the first target image TI1 and the second target image TI2 are not alignable. If the first target image TI1 and the second target image TI2 are not alignable, the display control unit 30 causes the display 14 to display the non-aligned composite image NCI.

Also, if the non-aligned composite image NCI is simply displayed on the display 14, the user may be unable to grasp whether the displayed image is the composite image CI or the non-aligned composite image NCI in some cases. Therefore, if the first target image TI1 and the second target image TI2 are not alignable by the alignment processing unit 26, the display control unit 30 may notify the user that alignment is unavailable. In the exemplary embodiment, as illustrated in FIG. 17, the display control unit 30 causes the display 14 to display text such as "Automatic correction unavailable." to notify the user that alignment is unavailable. Note that the notification may also be given according to a different method. For example, the user may also be notified with speech or sound output instead of, or in addition to, displaying the above text on the display 14.

Also, on the screen displayed on the display 14 in the case in which the first target image TI1 and the second target image TI2 are not alignable, the display control unit 30 may display the non-aligned composite image NCI together with a Yes button and a No button. The Yes button is associated with an instruction to create an image data file. If the user operates the Yes button, the composition processing unit 28 creates an image data file of the non-aligned composite image NCI in response to the creation instruction from the user. In this way, in the exemplary embodiment, if the first target image TI1 and the second target image TI2 are not alignable, the composition processing unit 28 forms the non-aligned composite image NCI, and then waits for an instruction from the user to create an image data file of the non-aligned composite image NCI.

Note that in some cases, the user may desire to create an image data file of the non-aligned composite image NCI even if the first target image TI1 and the second target image TI2 are not alignable. For example, in some cases, the first target image TI1 and the second target image TI2 are not alignable, but the different between the orientations of the first target image TI1 and the second target image TI2 is slight, and even the non-aligned composite image NCI is substantially acceptable. To accommodate such cases, in the exemplary embodiment, the Yes button is also provided on the screen displayed on the display 14 in cases where the first target image TI1 and the second target image TI2 are not alignable.

The No button is associated with an instruction to reacquire at least one of the first target image TI1 or the second target image TI2, similarly to the No button included on the screen displayed on the display 14 in the case where the first target image TI1 and the second target image TI2 are alignable. Accordingly, if the user operates the No button, an instruction is given (in other words, the processor 20 receives the instruction) to reacquire at least one of the first target image TI1 or the second target image TI2. On the basis thereof, the reading processing unit 22 reacquires at least one of the first read image SI1 or the second read image SI2. Prior to the reacquisition of at least one of the first read image SI1 or the second read image SI2, the display control unit 30 may also be configured to notify the user to check the orientation of the reading target T.

Figure 18:
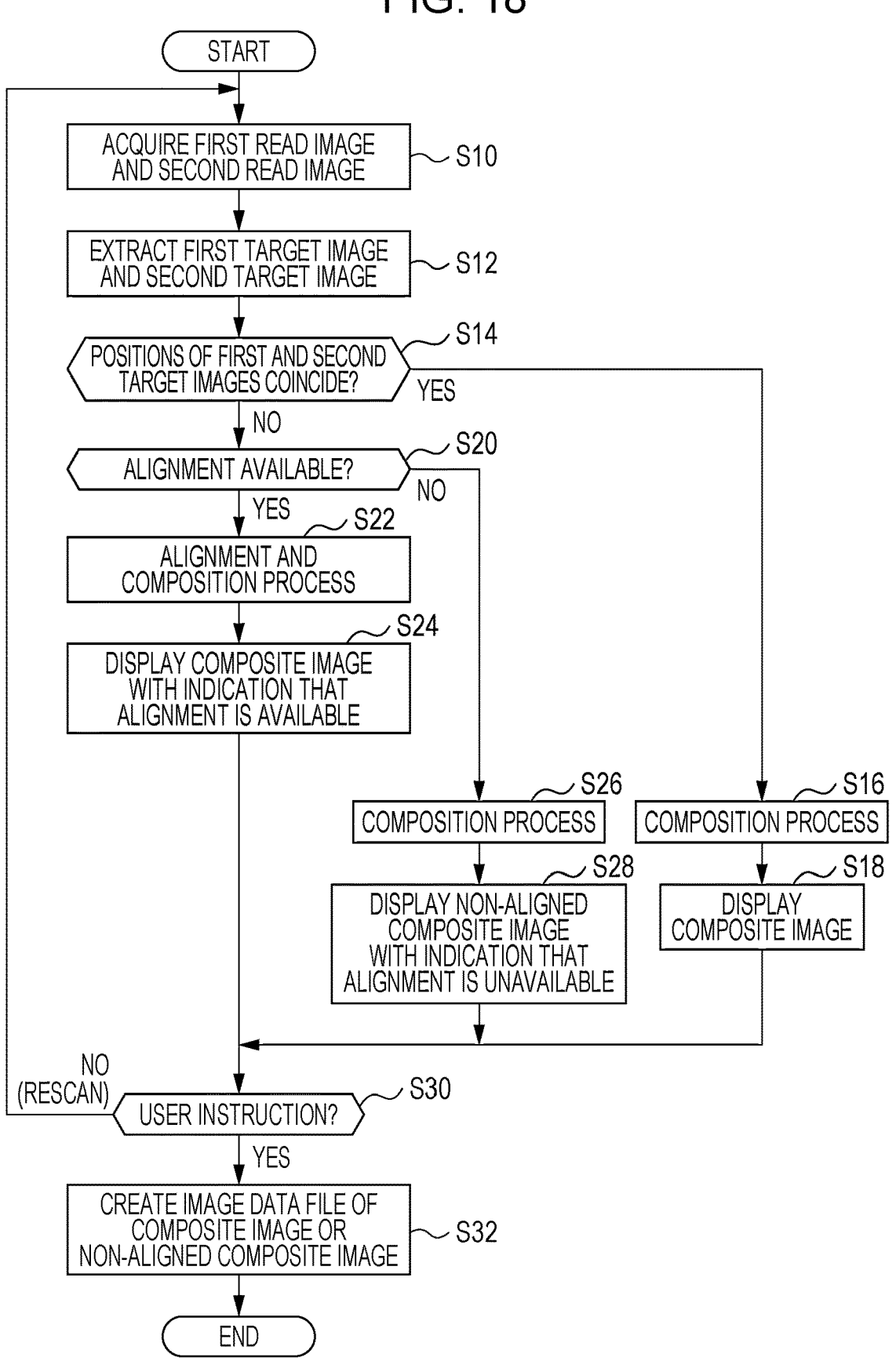
FIG. 18 is a flowchart illustrating a flow of processing by the image processing apparatus according to the exemplary embodiment.
Figure 19:
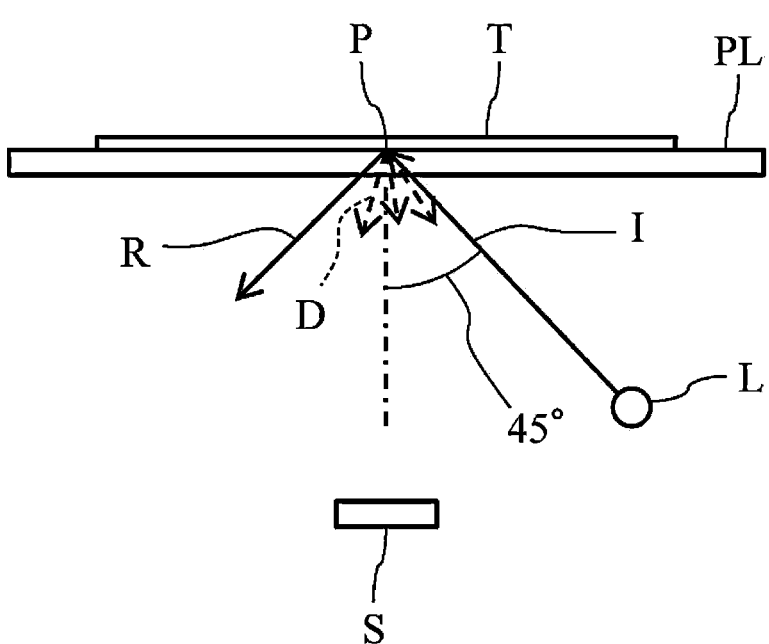
FIG. 19 is a conceptual diagram illustrating the structure of an image reading apparatus of the related art.

The foregoing gives an overview of the image processing apparatus 10 according to the exemplary embodiment. Hereinafter, a flow of processing by the image processing apparatus 10 will be described by following the flowchart illustrated in FIG. 18.

In step S10, the reading processing unit 22 controls the scanner 18 to acquire the first read image SI1 and the second read image SI2.

In step S12, the target image extraction unit 24 extracts the first target image TI1 from the first read image SI1 acquired in step S10. The target image extraction unit 24 also extracts the second target image TI2 from the second read image SI2 acquired in step S10.

In step S14, the alignment processing unit 26 determines whether the position of the first target image TI1 and the position of the second target image TI2 coincide. At this point, if the positions coincide, alignment is unnecessary. Thereafter, in step S16, the composition processing unit 28 may simply execute the composition process of compositing the non-glossy region NGR of the first target image TI1 and the glossy region GR of the second target image TI2 to form the composite image CI, and in step S18, the display control unit 30 may simply cause the display 14 to display the composite image CI formed in step S16. Herein, it is assumed that the position of the first target image TI1 and the position of the second target image TI2 are determined not to coincide with each other in step S14, and the flow proceeds to step S20.

In step S20, the alignment processing unit 26 determines whether the first target image TI1 and the second target image TI2 are alignable by translating or rotating at least one of the first target image TI1 or the second target image TI2. If alignable is available, the flow proceeds to step S22.

In step S22, the alignment processing unit 26 aligns the first target image TI1 and the second target image TI2, and executes the composition process of compositing the non-glossy region NGR of the aligned first target image TI1 with the glossy region GR of the aligned second target image TI2 to form the composite image CI.

In step S24, the display control unit 30 notifies the user that the first target image TI1 and the second target image TI2 are alignable and causes the display 14 to display the composite image CI.

On the other hand, in the case of determining that alignment is unavailable in step S20, the flow proceeds to step S26.

In step S26, the composition processing unit 28 executes the composition process of compositing the non-glossy region NGR of the non-aligned first target image TI1 with the glossy region GR of the non-aligned second target image TI2 to form the non-aligned composite image NCI.

In step S28, the display control unit 30 notifies the user that the first target image TI1 and the second target image TI2 are not alignable and causes the display 14 to display the non-aligned composite image NCI.

In step S30, the composition processing unit 28 determines an instruction from the user. If the instruction from the user is an instruction to reacquire at least one of the first target image TI1 or the second target image TI2, the flow returns to step S10. In the repeat of step S10, the reading processing unit 22 controls the scanner 18 to reacquire at least one of the first target image TI1 or the second target image TI2. If the instruction from the user is a creation instruction to create an image data file, the flow proceeds to step S32.

In step S32, the composition processing unit 28 creates an image data file of the composite image CI (in the case of going through step S18 or S24) or the non-aligned composite image NCI.

The foregoing describes an exemplary embodiment of the present disclosure, but the present disclosure is not limited to the exemplary embodiment, and various modifications are possible without departing from the scope of the present disclosure.

For example, in the exemplary embodiment, the functions of the reading processing unit 22, target image extraction unit 24, alignment processing unit 26, composition processing unit 28, and display control unit 30 are included in the processor 20 of the image processing apparatus 10, but these functions may also be included in a processor of an apparatus (such as a personal computer or a server, for example) other than the image processing apparatus that includes the scanner 18. In this case, the apparatus provided with the processor having the above functions executes various processing after having obtained the first read image SI1 and the second read image SI2 from the image processing apparatus that acquires the first read image SI1 and the second read image SI2.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image processing apparatus including:

a processor configured to:

extract a first target image corresponding to a reading target having a glossy portion and a non-glossy portion from a first read image acquired by optically reading the reading target in a first reading environment, and extract a second target image corresponding to the reading target from a second read image acquired by optically reading the reading target in a second reading environment in which specular light acquired from the reading target by an image sensor is of higher intensity compared to the first reading environment;

execute an alignment of the first target image and the second target image if positions of the first and second target images do not coincide with each other and if the first and second target images are alignable by translating or rotating at least one of the first target image or the second target image; and form a composite image by executing a composition process that composites a non-glossy region corresponding to the non-glossy portion extracted from the first target image with a glossy region corresponding to the glossy portion extracted from the second target image.

(((2)))

The image processing apparatus according to (((1))), wherein the processor is configured to determine whether the alignment is available after reducing the first target image and the second target image by the same scaling factor.

(((3)))

The image processing apparatus according to (((1))), wherein the processor is configured to:

cause a display to display the composite image; and create an image data file of the composite image in response to an instruction from a user.

(((4)))

The image processing apparatus according to (((3))), wherein the processor is configured to:

form a non-aligned composite image by executing the composition process without executing the alignment; and cause the display to display the composite image and the non-aligned composite image.

(((5)))

The image processing apparatus according to (((1))), wherein the processor is configured to:

notify a user that the alignment is available if the alignment is available; and notify the user that the alignment is unavailable if the alignment is unavailable.

(((6)))

The image processing apparatus according to (((5))), wherein the processor is configured to:

cause a display to display the composite image if the alignment is available; and cause the display to display a non-aligned composite image formed by executing the composition process without executing the alignment if the alignment is unavailable.

(((7)))

The image processing apparatus according to (((5))), wherein the processor is configured to:

receive from the user an instruction regarding whether to reacquire at least one of the first read image or the second read image prior to generating an image data file of the composite image; and reacquire at least one of the first read image or the second read image if a reacquisition instruction is received from the user.

(((8)))

The image processing apparatus according to (((7))), wherein the processor is configured to create an image data file of the composite image if the alignment is available and an instruction to create the image data file is received from the user.

(((9)))

The image processing apparatus according to (((7))), wherein the processor is configured to create an image data file of a non-aligned composite image formed by executing the composition process without executing the alignment process if the alignment is unavailable and an instruction to create the image data file is received from the user.

(((10)))

The image processing apparatus according to (((1))), wherein an orientation of the reading target is changed between a reading process of reading the reading target in the first reading environment and a reading process of reading the reading target in the second reading environment.

(((11)))

An image processing program causing a computer to execute a process including:

extracting a first target image corresponding to a reading target having a glossy portion and a non-glossy portion from a first read image acquired by optically reading the reading target in a first reading environment, and extracting a second target image corresponding to the reading target from a second read image acquired by optically reading the reading target in a second reading environment in which specular light acquired from the reading target by an image sensor is of higher intensity compared to the first reading environment;

executing an alignment of the first target image and the second target image if positions of the first and second target images do not coincide with each other and if the first and second target images are alignable by translating or rotating at least one of the first target image or the second target image; and forming a composite image by executing a composition process that composites a non-glossy region corresponding to the non-glossy portion extracted from the first target image with a glossy region corresponding to the glossy portion extracted from the second target image.

What is claimed is:

1. An image processing apparatus comprising:

a processor configured to:

extract a first target image corresponding to a reading target having a glossy portion and a non-glossy portion from a first read image acquired by optically reading the reading target in a first reading environment, and extract a second target image corresponding to the reading target from a second read image acquired by optically reading the reading target in a second reading environment in which specular light acquired from the reading target by an image sensor is of higher intensity compared to the first reading environment;

execute an alignment of the first target image and the second target image if positions of the first and second target images do not coincide with each other and if the first and second target images are alignable by translating or rotating at least one of the first target image or the second target image;

form a composite image by executing a composition process that composites a non-glossy region corresponding to the non-glossy portion extracted from the first target image with a glossy region corresponding to the glossy portion extracted from the second target image;

notify a user that the alignment is available if the alignment is available; and notify the user that the alignment is unavailable if the alignment is unavailable.

2. The image processing apparatus according to claim 1, wherein the processor is configured to determine whether the alignment is available after reducing the first target image and the second target image by a same scaling factor.

3. The image processing apparatus according to claim 1, wherein the processor is configured to:

cause a display to display the composite image; and create an image data file of the composite image in response to an instruction from the user.

4. The image processing apparatus according to claim 3, wherein the processor is configured to:

form a non-aligned composite image by executing the composition process without executing the alignment; and cause the display to display the composite image and the non-aligned composite image.

5. The image processing apparatus according to claim 1, wherein the processor is configured to:

cause a display to display the composite image if the alignment is available; and cause the display to display a non-aligned composite image formed by executing the composition process without executing the alignment if the alignment is unavailable.

6. The image processing apparatus according to claim 1, wherein the processor is configured to:

receive from the user an instruction regarding whether to reacquire at least one of the first read image or the second read image prior to generating an image data file of the composite image; and reacquire at least one of the first read image or the second read image if a reacquisition instruction is received from the user.

7. The image processing apparatus according to claim 6, wherein the processor is configured to create an image data file of the composite image if the alignment is available and an instruction to create the image data file is received from the user.

8. The image processing apparatus according to claim 6, wherein the processor is configured to create an image data file of a non-aligned composite image formed by executing the composition process without executing the alignment if the alignment is unavailable and an instruction to create the image data file is received from the user.

9. The image processing apparatus according to claim 1, wherein an orientation of the reading target is changed between a reading process of reading the reading target in the first reading environment and a reading process of reading the reading target in the second reading environment.

10. An image processing method comprising:

extracting a first target image corresponding to a reading target having a glossy portion and a non-glossy portion from a first read image acquired by optically reading the reading target in a first reading environment, and extracting a second target image corresponding to the reading target from a second read image acquired by optically reading the reading target in a second reading environment in which specular light acquired from the reading target by an image sensor is of higher intensity compared to the first reading environment;

executing an alignment of the first target image and the second target image if positions of the first and second target images do not coincide with each other and if the first and second target images are alignable by translating or rotating at least one of the first target image or the second target image;

forming a composite image by executing a composition process that composites a non-glossy region corresponding to the non-glossy portion extracted from the first target image with a glossy region corresponding to the glossy portion extracted from the second target image;

notifying a user that the alignment is available if the alignment is available; and notifying the user that the alignment is unavailable if the alignment is unavailable.

11. A non-transitory computer readable medium storing a program causing a computer to execute a process for image processing, the process comprising:

extracting a first target image corresponding to a reading target having a glossy portion and a non-glossy portion from a first read image acquired by optically reading the reading target in a first reading environment, and extracting a second target image corresponding to the reading target from a second read image acquired by optically reading the reading target in a second reading environment in which specular light acquired from the reading target by an image sensor is of higher intensity compared to the first reading environment;

executing an alignment of the first target image and the second target image if positions of the first and second target images do not coincide with each other and if the first and second target images are alignable by translating or rotating at least one of the first target image or the second target image;

forming a composite image by executing a composition process that composites a non-glossy region corresponding to the non-glossy portion extracted from the first target image with a glossy region corresponding to the glossy portion extracted from the second target image;

notifying a user that the alignment is available if the alignment is available; and notifying the user that the alignment is unavailable if the alignment is unavailable.

* * * * *